United States Patent Office 2,891,675
Patented June 23, 1959

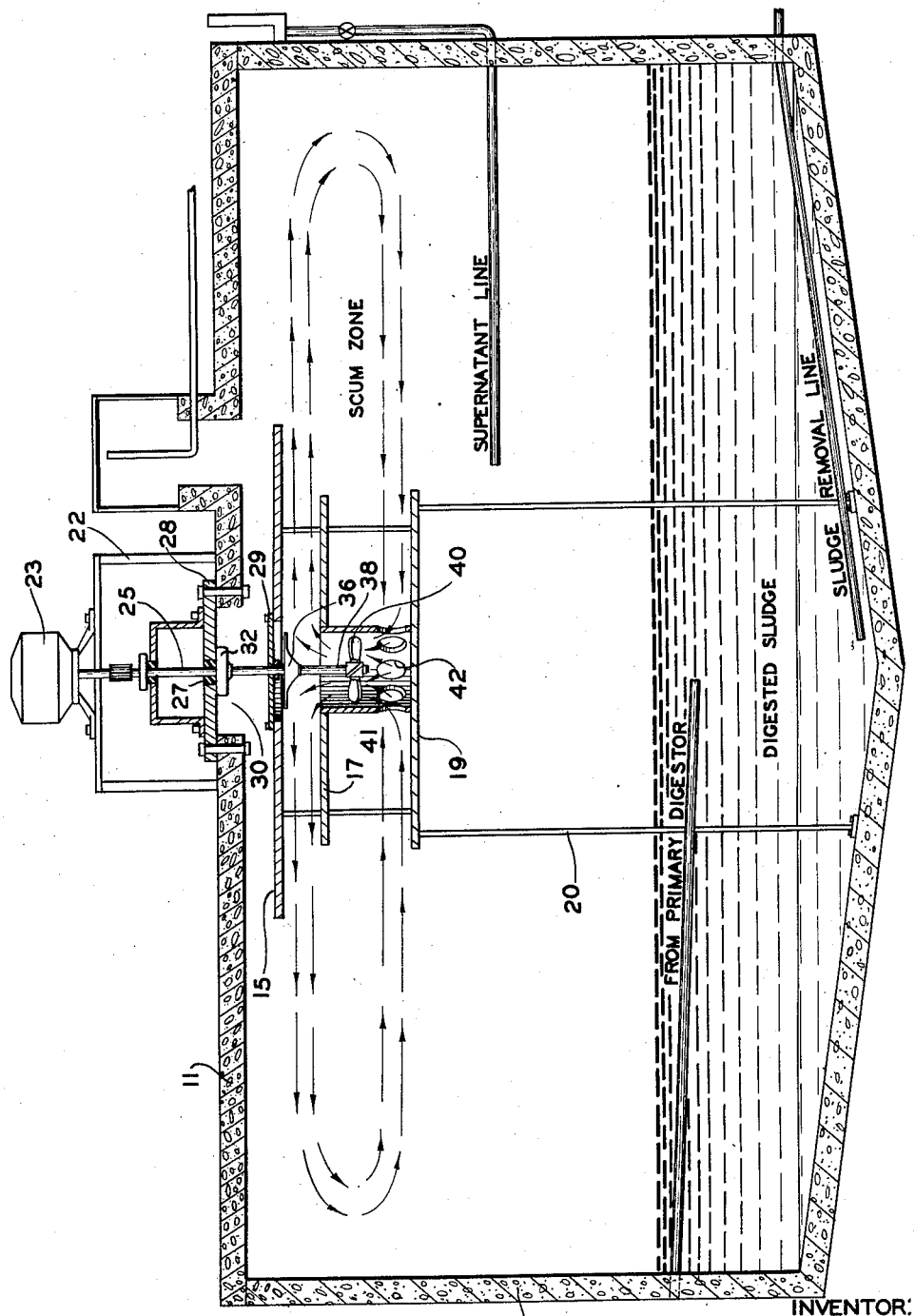

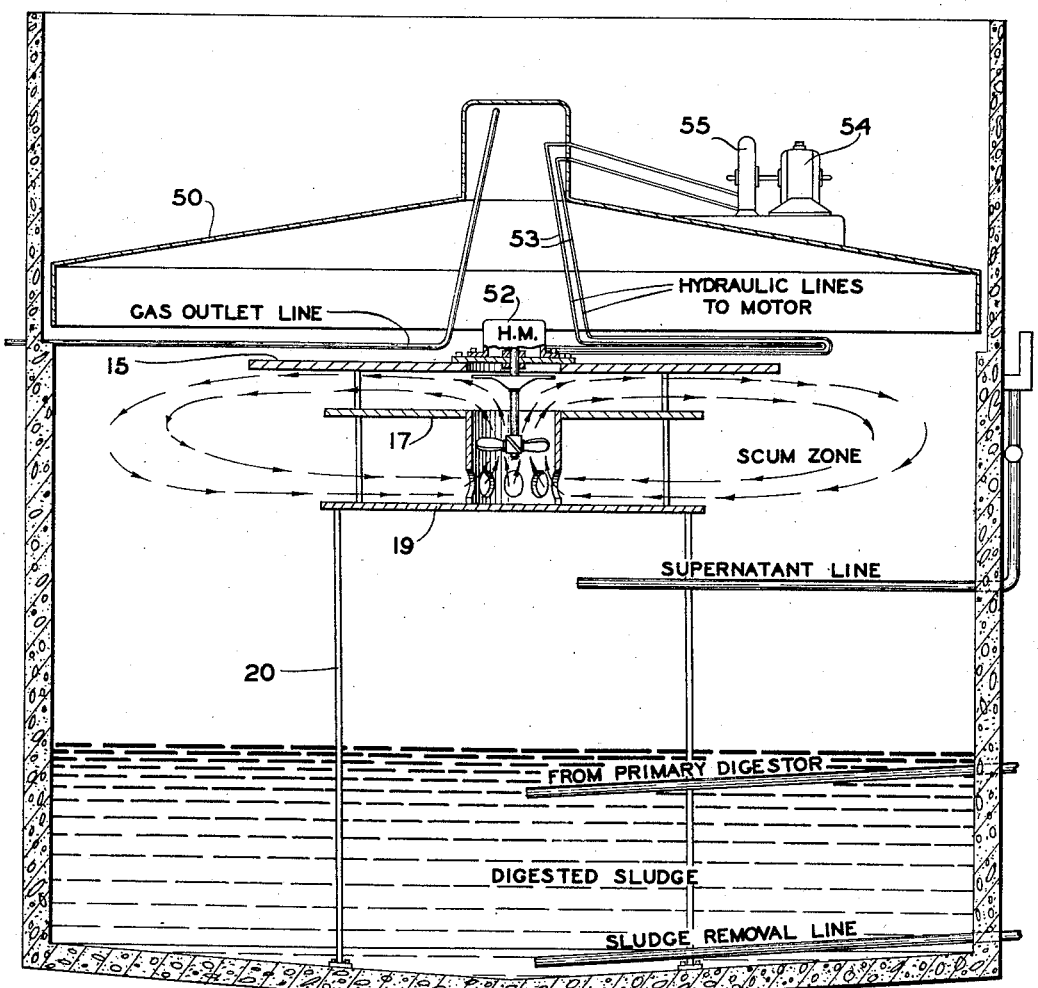

2,891,675

SLUDGE DIGESTION APPARATUS

Hilton C. Kaplon, Chicago, Ill.

Application May 23, 1955, Serial No. 510,416

2 Claims. (Cl. 210—539)

My invention relates to the treatment of sewage in digestion tanks, and more particularly to the separation of scum, sludge and supernatant layers for the efficient disposal thereof.

In the treatment of sewage, industrial wastes, garbage mixtures and other organic matter in digestion tanks, a floating scum layer develops as a result of the sludge formed by the substances mentioned. Various methods have been employed to break up the scum layer, such as by agitation or induced circulation. However, these methods usually disturb the contents of parts of the digester, and contaminate the supernatant liquor zone. In some installations elaborate mechanical apparatus is employed, involving much expense and taking up considerable room in the digestion tank. Also, such mechanical apparatus, by speeding up the process of separation, disturbs the normal process of fermentation and digestion in the tank, defeating the purpose of the same.

In view of the above situation, it is one object of the present invention to provide an apparatus in the digestion tank which not only promotes the normal digestion process, but also tends to increase the depth of the supernatant liquid while minimizing the layer of scum.

Since the scum layer is generally built up of grease, fat and occluded gases which are produced by the fermentation process in the digestion tank contents, it is another object of the invention to separate the gas and fatty matter, so that the gas may escape and the solids drop to the bottom for normal digestion.

A further object of the invention is to depart from the practice of setting up partitions within the digestion tank in order to secure a good supernatant liquor, but provide efficient means for maintaining the most desirable temperature and volume of sludge, in order that a large amount of the supernatant liquor may be maintained without difficulty despite the ever-increasing top layer of fat and grease generally termed as scum.

An additional object is to provide means for counteracting tendencies for violent agitation induced by circulation of the digestion tank contents, such means serving to baffle the material away from the roof of the digester, so that scum or muck, usually entering the gas lines when gas is used in the breaking up of the scum, will be kept out of such gas lines.

An important object of the invention is to employ an apparatus which is compact and in which working parts are readily accessible for cleaning or other attention.

With the above objects in view, a better understanding of the invention may be had by reference to the accompanying drawings, in which—

Fig. 1 is a section of the improved digestion tank, showing the novel apparatus mounted therein; and Fig. 2 is a similar view wherein the cover of the tank is a floating type.

In accordance with the foregoing, specific reference to the drawings indicates the digestion tank at 10, the same having a top cover 11.

For the purpose of the present invention, the tank receives a set of horizontal discs in its upper portion, such discs being made of metal or cement. In a large digester, the top disc 15, which is the largest of the set, is about one and one-half feet below the cover 11, while the next disc 17 is about one foot below the disc 15. The lowermost disc 19 would be about six and one-half feet below the cover 11 for a digester with a depth of twenty to twenty-five feet. As shown, the set of discs is situated in the center of the tank, and light lines indicate suitable posts 20 erected in the tank for the support of the discs, although any other means may be employed for this purpose, such as suspension hangers or brackets, it being advisable to use a minimum number of and lateral dimension in such elements, in order that they may not take up a considerable amount of room in the tank.

The cover 11 receives a frame 22 over it in the axial zone of the internal discs, such frame supporting a motor 23. This motor has a vertical shaft 25 descending through an oil seal bearing 27 mounted on a plate 28 which spans an opening 30 in the cover 11. The motor shaft 25 enters a socket 32 carried by the plate 28 to make a separable joint with a spindle 38, the latter passing through a guide bar 29 which spans an opening in the disc 15. Below the latter the spindle carries a radial deflector 36 and a propeller 40. The installation of the frame 22, motor 23, plate 28 and guide bar 29 is designed as a unit which may be uncoupled and raised to withdraw the motor shaft from the socket 32 in order that the motor drive may be serviced or access had into the tank for attention to the propeller or other parts therein.

The discs 17 and 19 are connected by an axial tube 41 into which the propeller 40 depends. The lower portion of the tube is formed with a series of portholes 42.

The velocity of the propeller 40 is approximately six hundred to twelve hundred r.p.m., so that the contents of the scum zone will be circulated to pass into the tube 41 by way of the portholes 42. The velocity of the propeller will distribute the material in the upper part of the tank so widely as to get all parts of the surface thereof into action. This will break up the scum into fine pieces or particles, causing the gas to be released and the solids to drop to the bottom of the tank.

The discs 15, 17 and 19 play an important part in conjunction with the action of the propeller 40 and center tube 41. Thus, the supernatant and scum mixture is thrown up and outwardly by the propeller against the disc 15, which serves primarily as a baffle. The force of the propeller spreads the mixture centrifugally away from the center draft tube 41 toward the walls of the digester. The circulation now involves both the scum and the supernatant liquid at increasing velocity from the center with the effect of breaking up the scum layer and causing the material to return into the zone between the discs 17 and 19 and through the portholes 42 to be recirculated by the action of the propeller 40, as indicated by arrows in Fig. 1.

One advantage gained by the type of circulation just described is the agitation of the scum level, this releasing the gas from the solids, such gas passing out through a gas line 45. Thus, the separated solids drop to the bottom of the digester without any accompanying violent action. Specifically, the disc 15 prevents muck and scum from striking the ceiling of the digester tank and blocking the gas line outlet, at the same time acting as a large deflector for the scum circulation, while the disc 19 serves as a baffle between the scum layer and the supernatant liquid, permitting circulation through the center tube 41 without breaking up the supernatant zone. The relatively close spacing between the discs 15 and 17 attenuates the medium traveling outwardly between them, securing an increased velocity and wide spread of the same.

In the modified form of tank, shown in Fig. 2, the cover 50 is of the floating type. In order to accommodate the invention to the same, the motor 52 is preferably a hydraulically-driven one, with flexible tubing 53 leading from a power unit 54 on the outside. Such power unit would incorporate a hydraulic pump 55. This construction maintains the propeller driving motor in a stationary position, while the power plant to drive the same may be moved with the floating cover of the tank.

It will now be apparent that the novel installation has a number of advantageous features. Thus, the system provides the necessary circulation in the scum zone to break up the grease and fats, and to separate the occluded gases. Further, it provides a dome or baffle to prevent the turbulent action of the circulated liquid from rising and plugging the outlet to the gas lines. Further, a circulating zone is provided which defines a floor as a bar to the circulation of the scum, so that the latter may not disturb the action in all parts of the digestion tank. Further, the apparatus is adaptable either to a fixed or movable digestion tank cover. Further, the equipment is so installed as to be removable for servicing or access to the tank interior without requiring the tank to be emptied. Further, where the hydraulic operation of the propeller is installed, a safety factor is gained by not having any electrical apparatus in contact with the producing of gas as a by-product of the digestion process. Finally, the novel apparatus is of a compact nature and occupies a minimum of room within the digestion tank.

While I have described the invention and its modification along specific lines, various minor changes or refinements may be made therein without departing from its principle, and I reserve the right to employ all such changes and refinements as may come within the scope and spirit of the appended claims.

I claim:

1. A sludge digestion apparatus comprising a tank adapted to accommodate a top layer of scum and a lower layer of supernatant liquid, a horizontal partition in the supernatant liquid zone, a second partition in the scum zone, a baffle plate spaced above the second partition, and a unit between the partitions operative to induce an outward circulation between the upper partition and the baffle plate and an inward circulation between the partitions.

2. A sludge digestion apparatus comprising a tank adapted to accommodate a top layer of scum and a lower layer of supernatant liquid, a horizontal partition in the supernatant liquid zone, a second partition spaced above the first one and having a central opening, a unit between the partitions operative to induce turbulence between the same and the top of the tank, said partitions being discs joined by a vertical central tube meeting the opening in the upper partition and closed by the lower one, and said unit comprising a rotary propeller disposed in the upper portion of the tube, the lower portion thereof having side ports.

References Cited in the file of this patent

UNITED STATES PATENTS

| | | |
|---|---|---|
| 1,806,698 | Miller | May 26, 1931 |
| 1,880,773 | Buswell et al. | Oct. 4, 1932 |
| 2,063,301 | Durdin | Dec. 8, 1936 |
| 2,165,889 | Fischer et al. | July 11, 1939 |
| 2,429,316 | Green | Oct. 21, 1947 |
| 2,443,646 | Turner | June 22, 1948 |
| 2,444,671 | Prager | July 6, 1948 |

FOREIGN PATENTS

| | | |
|---|---|---|
| 582,801 | Germany | Aug. 23, 1933 |